(12) United States Patent
Thubert et al.

(10) Patent No.: US 7,778,235 B2
(45) Date of Patent: Aug. 17, 2010

(54) COMPRESSION OF A ROUTING HEADER IN A PACKET BY A MOBILE ROUTER IN AN AD HOC NETWORK

(75) Inventors: Pascal Thubert, La Colle sur Loup (FR); Thomas Berry, Holly Springs, NC (US); Vincent Jean Ribiere, Biot (FR); Alvaro Enrique Retana, Raleigh, NC (US); Russell Ivan White, Holly Springs, NC (US)

(73) Assignee: Cisco Technology, Inc., San Jose, CA (US)

( * ) Notice: Subject to any disclaimer, the term of this patent is extended or adjusted under 35 U.S.C. 154(b) by 689 days.

(21) Appl. No.: 11/494,585

(22) Filed: Jul. 28, 2006

(65) Prior Publication Data

US 2007/0153764 A1    Jul. 5, 2007

Related U.S. Application Data

(63) Continuation-in-part of application No. 11/324,270, filed on Jan. 4, 2006, now abandoned.

(51) Int. Cl.
*H04L 12/28* (2006.01)

(52) U.S. Cl. .................. 370/351; 370/328; 709/221

(58) Field of Classification Search .................. 370/351, 370/328, 338, 401, 466; 709/221
See application file for complete search history.

(56) References Cited

U.S. PATENT DOCUMENTS

| 6,704,293 | B1 | 3/2004 | Larsson et al. |
| 6,744,740 | B2 | 6/2004 | Chen |
| 7,039,035 | B2 | 5/2006 | Droms et al. |
| 7,177,295 | B1 * | 2/2007 | Sholander et al. ........... 370/338 |
| 2002/0039357 | A1 | 4/2002 | Lipasti et al. |

(Continued)

FOREIGN PATENT DOCUMENTS

EP    1 324 532 A2    7/2003

OTHER PUBLICATIONS

U.S. Appl. No. 11/324,270, filed Jan. 4, 2006, Thubert et al.

(Continued)

*Primary Examiner*—Dang T Ton
*Assistant Examiner*—Wei Zhao
(74) *Attorney, Agent, or Firm*—Leon R. Turkevich

(57) ABSTRACT

Each mobile router in a mobile ad hoc network is configured for identifying routes to nearby nodes that are within a prescribed distance, based on storage of explicit paths specified within routing headers of packets transmitted from a host node to a destination node. Each mobile router also can selectively compress the routing header, based on the storage of the explicit path, resulting in a loose source route type routing header in the packet output from the mobile router. In addition, a routing header of a received packet can be expanded based on the mobile router inserting the explicit path, enabling mobile hosts in the explicit path to forward the packet according to strict source routing. The storage and compression of explicit paths also can be applied to packets specifying reverse routing headers, minimizing the size of the reverse routing headers.

20 Claims, 7 Drawing Sheets

U.S. PATENT DOCUMENTS

| | | | |
|---|---|---|---|
| 2002/0062388 | A1 | 5/2002 | Oiger et al. |
| 2004/0032852 | A1 | 2/2004 | Thubert et al. |
| 2004/0081152 | A1 | 4/2004 | Thubert et al. |
| 2004/0117339 | A1 | 6/2004 | Thubert et al. |
| 2004/0167988 | A1 | 8/2004 | Rune et al. |
| 2005/0083974 | A1* | 4/2005 | Mayer et al. ............ 370/474 |
| 2005/0099971 | A1* | 5/2005 | Droms et al. ............ 370/328 |
| 2005/0185632 | A1* | 8/2005 | Draves et al. ............ 370/351 |
| 2005/0265259 | A1 | 12/2005 | Thubert et al. |
| 2006/0088051 | A1 | 4/2006 | Mulligan |

OTHER PUBLICATIONS

Pei et al., "Fisheye State Routing: A Routing Scheme for Ad Hoc Wireless Networks", Proceedings of the IEEE International Conference on Communications, pp. 70-74, New Orleans, LA, Jun. 2000. (Available via World Wide Web at citeseer.ist.psu.edu/article/pei00fisheye.html).

Baker., "An outsider's view of MANET", Network Working Group <draft-baker-manet-review-01> 39 pages, Mar. 17, 2002.

Perkins et al., "Ad hoc On-Demand Distance Vector (AODV) Routing", Mobile Ad Hoc Networking Working Group <draft-ietf-manet-aodv-13.txt> 37 pages, Feb. 13, 2003.

Jiang et al., "Cluster Based Routing Protocol (CBRP) Functional Specification" IETF Internet Draft <draft-ietf-manet-cbrp-spec-00.txt> 13 pages, Aug. 1998.

Johnson et al., "The Dynamic Source Routing Protocol for Mobile Ad Hoc Networks (DSR)" <draft-ietf-manet-dsr-10.txt> 112 pages, Jul. 19, 2004.

Gerla et al., Fisheye State Routing Protocol (FSR) for Ad Hoc Networks, IETF MANET Working Group, <draft-ietf-manet-fsr-03.txt> 17 pages, Jun. 17, 2002.

Information Sciences Institute, "Internet Protocol DARPA Internet Program Protocol Specification", Request for Comments: 791, 51 pages, Sep. 1981.

Johnson et al., "Mobility Support in IPv6", Network Working Group, Request for Comments: 3775, 165 pages, Jun. 2004.

Devarapalli et al., "Network Mobility (NEMO) Basic Support Protocol", Network Working Group, Request for Comments: 3963, 33 pages, Jan. 2005.

* cited by examiner

COMPRESSION OF A ROUTING HEADER IN A PACKET BY A MOBILE ROUTER IN AN AD HOC NETWORK

This application is a continuation-in-part of commonly-owned, application Ser. No. 11/324,270, filed Jan. 4, 2006, now abandoned the disclosure of which is incorporated in its entirety herein by reference.

BACKGROUND OF THE INVENTION

1. Field of the Invention

The present invention relates to efficient distribution of routing information in a mobile ad hoc network. In particular, the present invention relates to forwarding packets in a mobile ad hoc network that utilizes reactive routing protocols for route discovery, where the packets are forwarded in a manner that minimizes the transfer of routing information between nodes in the mobile ad hoc network during packet transmission.

2. Description of the Related Art

Mobile computing has evolved to an extent that it is no longer limited to a mobile computing model (e.g., "Mobile IP") that relies a fixed wide area network infrastructure such as the Internet to provide connectivity between a mobile node and a correspondent node; rather, a mobile ad hoc network (MANET) model has been pursued that enables an isolated group of mobile nodes to independently establish communications among each other (e.g., a "mesh") and establish optimized routing paths among each other.

The MANET model has been developed based on numerous proposals by Internet Engineering Task Force (IETF) groups: these IETF proposals (e.g., Requests for Comments (RFCs), Internet Drafts, etc.) have addressed improved mobility support of mobile devices (e.g., laptops, IP phones, personal digital assistants, etc.) in an effort to provide continuous connectivity between mobile ad hoc nodes.

The MANET model assumes no previous existing network topology: Internet connectivity is neither assumed nor precluded, and every network node is assumed to be mobile. Consequently, the MANET model assumes no more than a group of mobile nodes (e.g., mobile hosts and mobile routers) may arbitrarily connect to each other via available link layer ("Layer 2") connections, resulting in a mesh network.

The IETF has a Mobile Ad-hoc Networks (MANET) Working Group that is working to implement this ad hoc networking model by developing standardized MANET routing specification(s) for adoption by the IETF. According to the MANET Working Group, the "mobile ad hoc network" (MANET) is an autonomous system of mobile routers (and associated mobile hosts) connected by wireless links—the union of which form an arbitrary graph. The routers and hosts are free to move randomly and organize themselves arbitrarily; thus, the network's wireless topology may change rapidly and unpredictably. Such a network may operate in a standalone fashion, or may be connected to the larger Internet.

The MANET system is particularly suited to low-power radio networks that may exhibit an unstable topology, where wireless propagation characteristics and signal quality between a wireless transmission source and a receiver can be difficult to model and quantify. Since there is no fixed network infrastructure in a MANET, the device address is tied to the device, not a topological location. Hence, the formation of a MANET based on mobile nodes having established a mesh network raises issues as to whether a routing protocol should be deployed that provides network layer ("Layer 3") connectivity throughout the mesh network based on established routes.

For example, a proactive routing protocol (e.g., Open Shortest Path First (OSPF) as specified by RFC 1583) enables mobile routers in the MANET to distribute routing information among each other to create optimized network layer paths to each other (e.g., a tree topology-based path or parallel equal cost paths) before a data packet needs to be routed; hence, a router determines how to forward a packet based on accessing routing information from an internal table. However, proactive protocols suffer the disadvantage of increased overhead in implementing the routing protocol, resulting in reduced convergence time due to movement in the MANET. Consequently, if a mobile router in a MANET moves, the movement causes a change in the routing infrastructure that requires recalculation of routes in accordance with the new topology. Such movement can have even more disruptive effects in routing protocols that calculate multiple paths to a destination. Hence, routing algorithms that fail to ensure rapid convergence based on the recalculated routes will result in a failure of the routing protocol.

Certain proactive routing protocols have attempted to reduce the overhead associated with establishing precise routes within the MANET. For example, a "Fisheye State Routing" (FSR) protocol, described for example in an Internet Draft by Gerla et al., "Fisheye State Routing Protocol (FSR) for Ad Hoc Networks"<draft-ietf-manet-fsr-03.txt>, Jun. 17, 2002, describes a proactive routing protocol where nodes maintain a link state table based on link state advertisement messages received from neighboring nodes: the frequency of distributing link state advertisement messages is limited based on the "scope" of a node, wherein the nodes periodically exchange the information only with their neighbors that are within their "scope" (no flooding). Hence, the link state table of a node has precise and accurate path quality information for nearby nodes within its scope, with progressively less detail of further nodes outside its scope as the distance increases.

Reactive MANET protocols were developed to improve the convergence of MANET protocols, where routing information is acquired only when needed. Examples of reactive protocols include "AODV" as described in an Internet Draft by Perkins et al., "Ad hoc On-Demand Distance Vector (AODV) Routing <draft-ietf-manet-aodv.13>", Feb. 17, 2003, and "DSR" as described in an Internet Draft by Johnson et al., "The Dynamic Source Routing Protocol for Mobile Ad Hoc Networks (DSR) <draft-ietf-manet-dsr-10.txt>", Jul. 19, 2004. Another example of a reactive MANET protocol is IEEE 802.5 source route bridging.

Reactive MANET protocols such as the DSR protocol involve a source MANET host node locating a destination MANET host node by flooding the MANET with a discovery request to locate the destination: if an intermediate mobile host receives the discovery request and does not recognize the destination, the intermediate mobile host will add its network address and will flood the discovery request on its mesh links. Hence, the discovery request includes an explicit hop-by-hop path as it traverses the MANET: if the destination MANET host node is found, a reply is sent to the source MANET host node that includes the explicit hop-by-hop path. Hence, the source MANET host node can send a packet to the destination using strict source routing, where the packet includes a routing header that explicitly specifies the hop-by-hop path to the destination, eliminating the necessity for any further routing protocols.

Hence, strict source routing enables packets to be sent in a MANET network without relying on IP protocols, enabling deployment within layer 2 mesh networks (e.g., Token Ring, IEEE 802.11s, etc.), or layer 3 MANET networks utilizing reactive routing protocols such as DSR or AODV. Another example of strict source routing is illustrated in the form of a reverse routing header as described in U.S. Patent Publication No. US 2004/0117339, published Jun. 17, 2004, the disclosure of which is incorporated in its entirety herein by reference.

Strict source routing, however, suffers from the problem of requiring an explicit source route path within each and every packet: this explicit source route path substantially increases the packet size and reduces efficiency of the network. Moreover, the repeated flooding of the MANET with discovery and reply messages for each and every destination can substantially increase the latency for many applications, and substantially increase traffic within the MANET. Further, any link failure between two nodes in the explicit source route path requires a maintenance (i.e., recalculation) of all the routes that pass along the failed link, resulting in additional flooding of discovery and reply messages that bypass the failed link. Hence, the use of strict source routing reduces communications efficiency due to substantially increased overhead in packets utilizing routing headers, since a separate routing header is required for each hop in the path from a source node to a destination node.

Consequently, a fundamental problem with strict source routing is the associated increase in the size of a data packet, whereas the fundamental problem with proactive routing protocols is the amount of routing information that must be distributed to maintain network integrity (i.e., convergence of network routes) and to permit routing of packets.

A solution to these and other problems is described in the accompanying brief description of the attached drawings and the accompanying description of embodiment(s) of the invention as specified in the appended claims, the description of the embodiment(s) including at least one best mode for carrying out the invention.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
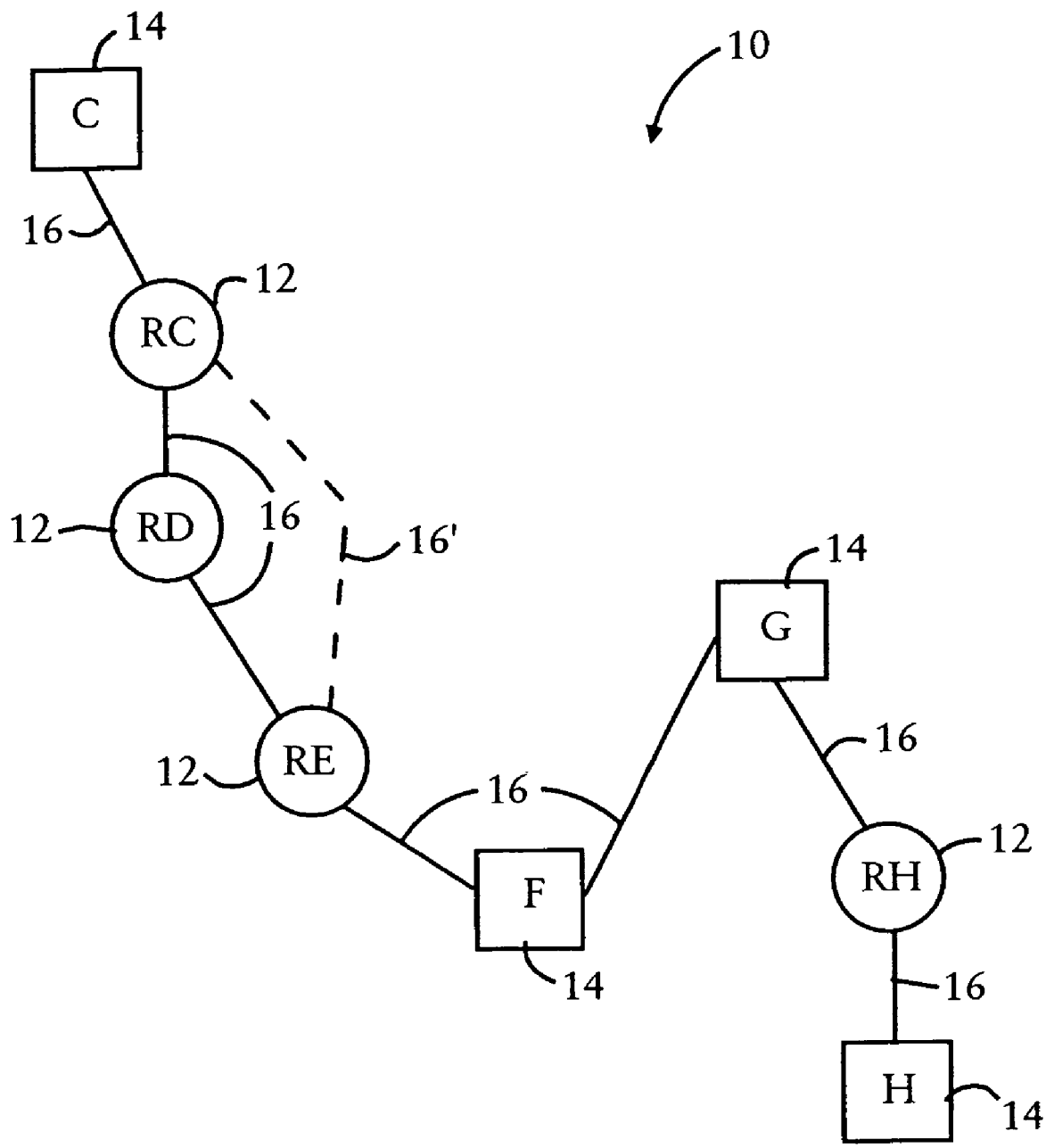
FIG. 1 is a diagram illustrating a mobile ad hoc network including mobile ad hoc routers configured for compressing and expanding routing headers based on retrieval of explicit paths for nearby nodes, according to an embodiment of the present invention.

As apparent from the foregoing description of the related art, there is a need for an arrangement that enables formation of mobile ad hoc networks without adversely affecting network convergence ability or communications efficiency. In particular, there is a need for an arrangement that minimizes the need for distributing unnecessary routing information throughout the network.

There also is a need for an arrangement that enables mobile ad hoc network routers to selectively filter routing information to prevent unnecessary routing information from being needlessly distributed throughout the mobile ad hoc network.

There also is a need for an arrangement that enables mobile ad hoc network routers utilizing a reactive routing protocol to change paths to destinations, without the necessity of recalculation of routes or modifying source route information having been distributed throughout the mobile ad hoc network.

These and other needs are attained by the disclosed embodiment, where each mobile router in the mobile ad hoc network is configured for identifying routes to nearby nodes that are within a prescribed distance, based on storage of explicit paths specified within routing headers of packets transmitted from a host node to a destination node. Each mobile router also can selectively compress the routing header, based on the storage of the explicit path, resulting in a loose source route type routing header in the packet output from the mobile router. In addition, a routing header of a received packet can be expanded based on the mobile router inserting the explicit path, enabling mobile hosts in the explicit path to forward the packet according to strict source routing. The storage and compression of explicit paths also can be applied to packets specifying reverse routing headers, minimizing the size of the reverse routing headers.

Hence, each mobile router within the mobile ad hoc network is able to learn routes to nearby nodes within a prescribed distance based on routing headers of received packets, enabling each mobile router to establish a "fisheye" routing table that specifies routing information for nearby mobile ad hoc nodes that are reachable within a prescribed distance (e.g., three to four hops), without the necessity of transmitting link state information between the mobile routers. Moreover, each mobile router can utilize its "fisheye" routing table to selectively compress the routing headers within the received packets by removing the routing information from the routing headers. Consequently, the mobile hosts utilizing reactive MANET protocols (e.g., DSR, AODV, etc.) receive the packets containing the compressed routing headers, enabling the compression from strict source routing to loose source routing, without any modification in the mobile host nodes in the MANET network.

Hence, the disclosed embodiment enables deployment of mobile routers within a mobile ad hoc network that utilize a "fisheye" routing table without the necessity of distributing link state information, and which improves efficiency of packets transmitted by mobile hosts by compressing the strict source routes into loose source routes, based on the routing information stored in the "fisheye" routing table. In addition, each mobile router can change a path to a destination based on updating its "fisheye" routing table, without any disruption or modification of source route information in any of the other mobile nodes in the MANET.

Additional advantages and novel features of the disclosed embodiment will be set forth in part in the description which follows and in part will become apparent to those skilled in the art upon examination of the following or may be learned by practice of the disclosed embodiment and its variations. These advantages may be realized and attained by means of instrumentalities and combinations particularly pointed out in the appended claims.

FIG. 1 is a diagram illustrating a mobile ad hoc network 10 formed by mobile ad hoc routers 12 and mobile hosts 14 establishing wireless layer 2 mesh links 16 according to a prescribed MANET link layer protocols.

The disclosed MANET network 10 of FIG. 1 establishes link layer connectivity via the links 16, however it is assumed herein that no proactive routing protocols are established between the mobile routers 12, and that only a reactive routing protocol such as DSR or AODV is utilized in order to learn routes to destinations while minimizing overhead and to ensuring rapid convergence based on any movement by any of the mobile routers 12 or the mobile hosts 14.

Each mobile router 12 is configured for parsing the routing header of each received packet in order to identify available routes to nearby nodes that are within a prescribed distance, and compress the routing header in order to eliminate redundant path information to the nearby nodes. If necessary, however, each mobile router 12 will preserve or expand routing information needed by neighboring nodes, for example in the case of mobile hosts 14 that are not configured to employ a "fisheye" routing table, but rather that rely solely on existing source routing protocols. Hence, each mobile router 12 can employ loose source routes within the corresponding fisheye.

Figure 2:
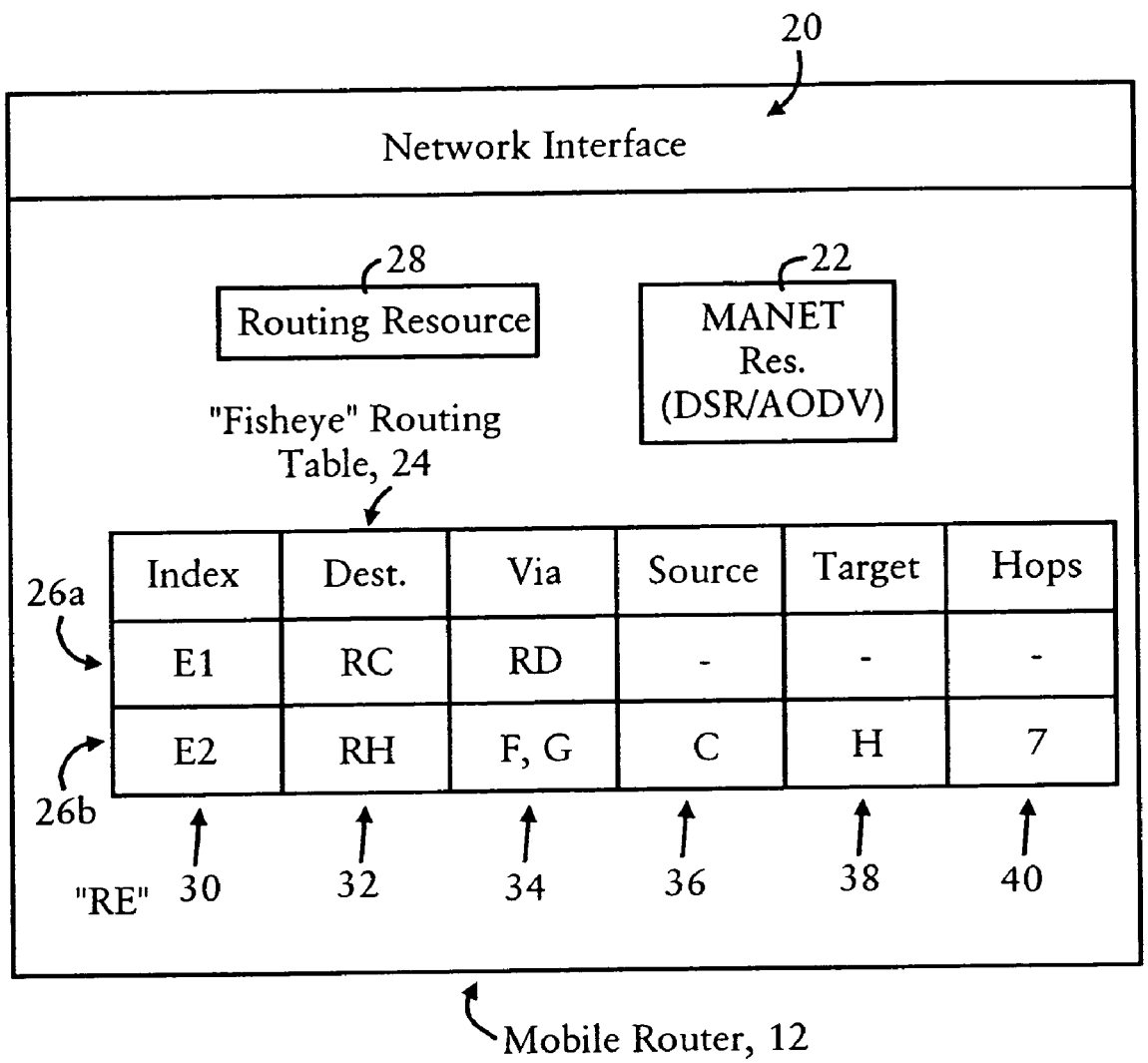
FIG. 2 is a diagram illustrating one of the mobile ad hoc routers of FIG. 1, according to an embodiment of the present invention.

FIG. 2 is a diagram illustrating a mobile ad hoc router 12, according to an embodiment of the present invention. The mobile router (e.g., "RE") 12 includes a network interface 20, a MANET resource 22, a "fisheye" routing table 24 having routing table entries 26 (e.g., 26a, 26b), and a routing resource 28.

The network interface 20 is configured for establishing the layer 2 mesh links 16 with any other available MANET mobile node (e.g., another mobile router 12 or a mobile host 14) based on existing link layer protocols. The network interface 20 also is configured for receiving data packets from next hop mobile nodes via the corresponding link 16.

The MANET resource 22 is configured for employing reactive MANET discovery protocols, for example DSR and AODV, in order to identify a route to a destination for any packet originated by the mobile router 12. As apparent from the foregoing, each mobile host 14 will include the network interface 20 and the MANET resource 22, but not the routing resource 28 or the routing table 24 described herein.

The routing resource 28 is configured for parsing each packet that is received by the network interface 20 in order to determine whether the "fisheye" routing table 24 should be updated, or whether the received packet should be modified to compress a routing header specifying a strict source route, or expand a routing header specifying a loose source route.

The "fisheye" routing table 24 illustrates two entries, each having corresponding fields including an index field 30, a destination node field 32, an explicit path field 34, a discovery source field 36, a discovery target field 38, and a hop count field 40. As described below, each entry 26 is added by the routing resource 28 in response to a received packet in order to specify an explicit path 34 for reaching a mobile ad hoc node (specified in the destination node field 32) that is within a prescribed distance (e.g., less than or equal to three hops). For example, the first routing table entry that specifies an index value of "E1" in the index field 30 specifies that the mobile ad hoc node ("RC") specified in the destination field 32 is reachable via the explicit path 34 of "RD"; hence, the routing resource 28 can determine that the mobile router "RC" 12 is reachable via the mobile router "RD" 12 at a single hop. As described below, the second routing table entry specifying the index value 30 of "E2" is added by the routing resource 28 in response to a reply message 44 sent by the mobile host 14 in response to a discovery message 42, illustrated in FIG. 4.

Figure 3A:
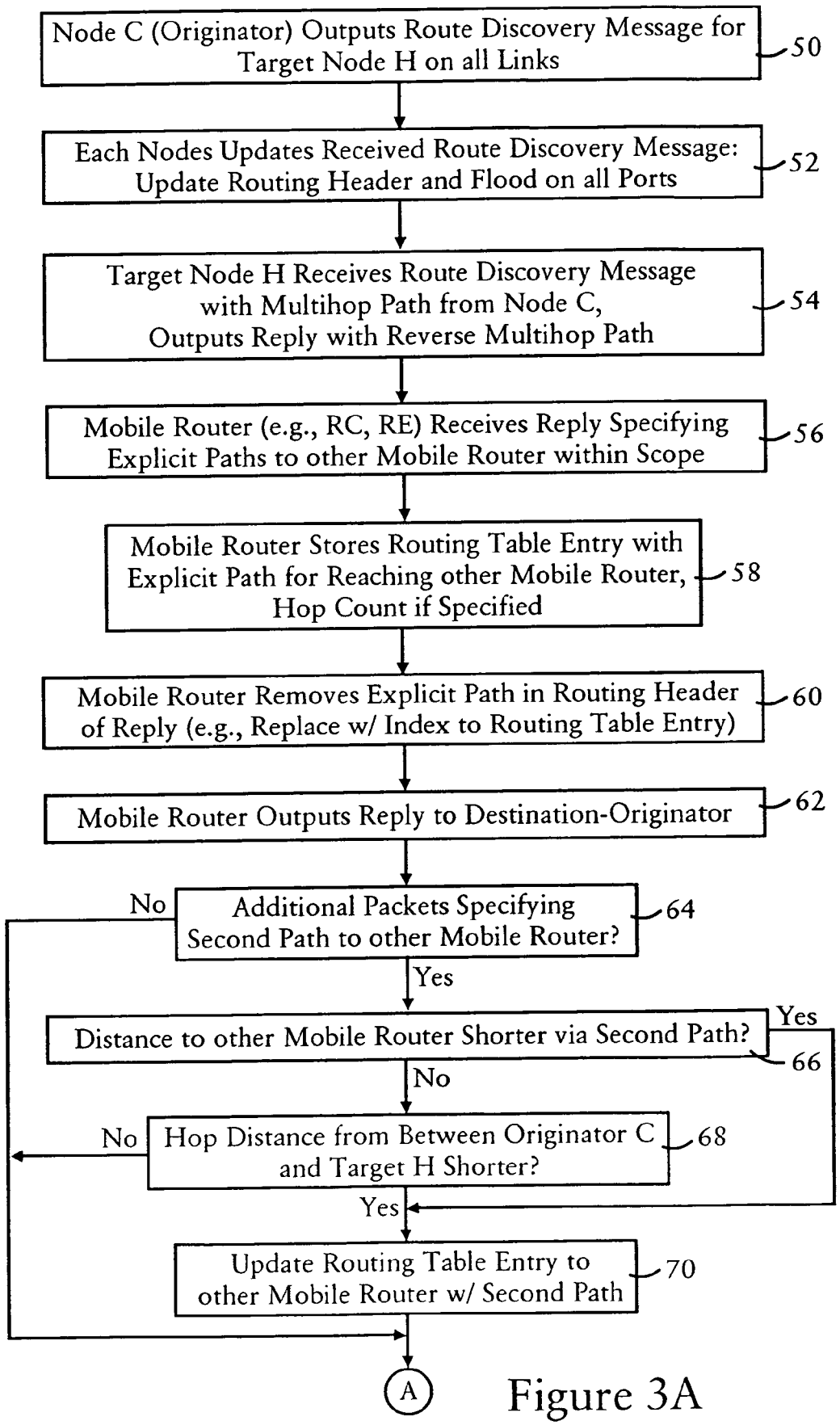
FIGS. 3A and 3B are diagrams summarizing storage of explicit paths for nearby nodes based on transfer of route discovery and route reply messages between mobile host nodes, and compression and expansion of routing headers by the mobile routers, according to an embodiment of the present invention.
Figure 3B:
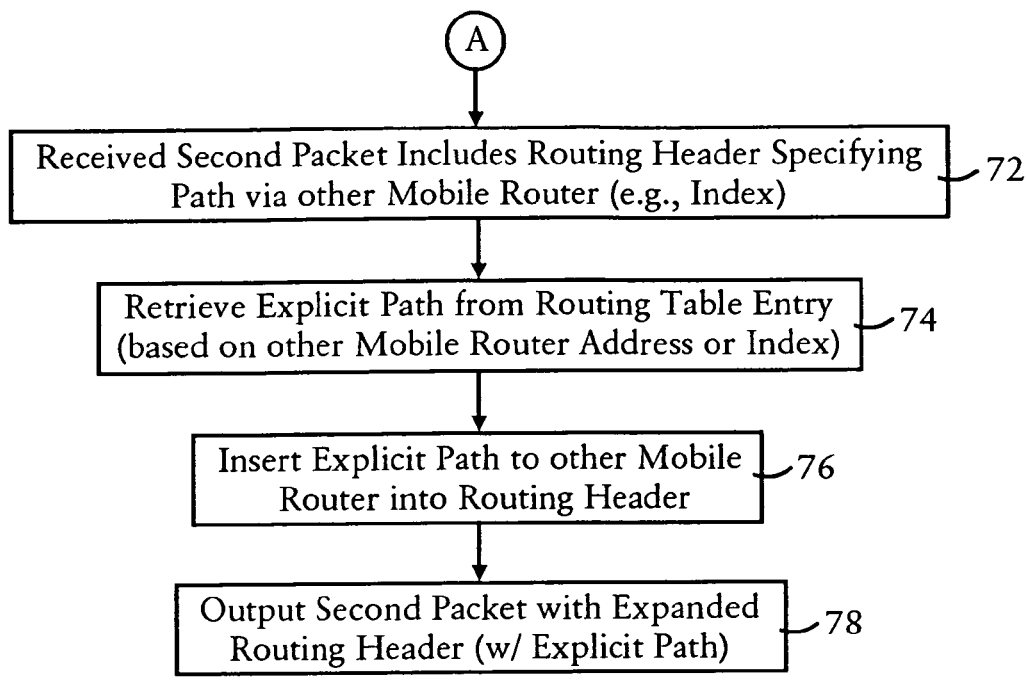

FIGS. 3A and 3B are diagrams summarizing storage of explicit paths for nearby nodes based on transfer of route discovery and route reply messages between mobile host nodes, and compression and expansion of routing headers by the mobile routers, according to an embodiment of the present invention. The steps described in FIGS. 3A and 3B (and below with respect to FIGS. 6A and 6B) can be implemented as executable code stored on a computer readable medium (e.g., a hard disk drive, a floppy drive, a random access memory, a read only memory, an EPROM, a compact disk, etc.), or propagated via a computer readable medium (e.g., a transmission wire, an optical fiber, a wireless transmission medium utilizing an electromagnetic carrier wave, etc.).

Figure 4:
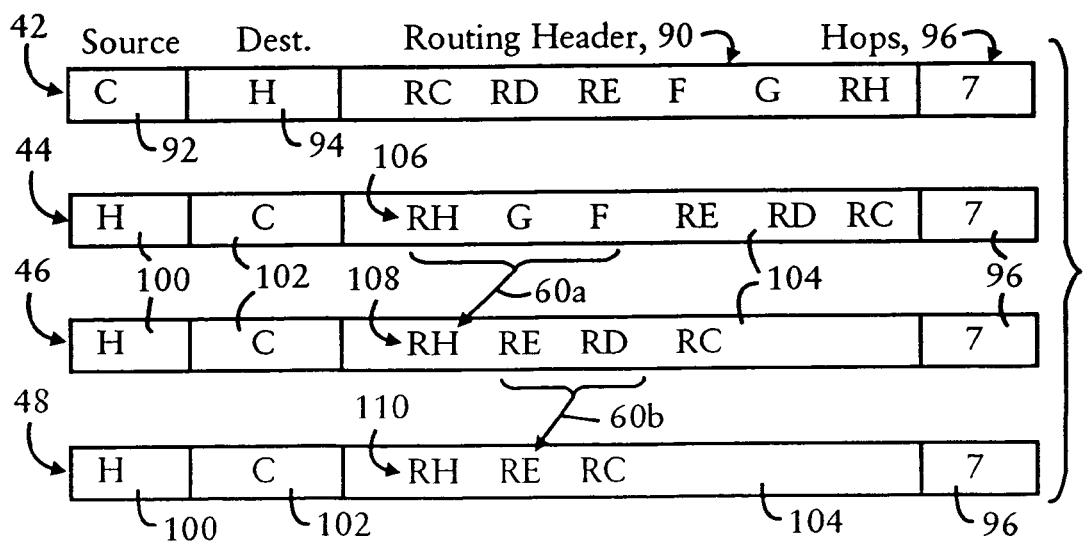
FIG. 4 is a diagram illustrating a route discovery message having traversed the network of FIG. 1, and compression of a route reply message traversing the network of FIG. 1, according to an embodiment of the present invention.

The method begins in step 50, following establishment of the layer 2 MANET links 16, by a MANET host node (e.g., "C") 14 outputting a route discovery message, for example according to DSR or AODV reactive routing protocols, in order to determine a route for reaching a target node (e.g., "H") 14. Hence, the host node "C" 14 is the originator of the route discovery message, and the host node "H" is the target of the route discovery message. Each intermediate mobile node (e.g., "RC", "RD", "RE", "F", "G", "RH") adds in step 52 its corresponding network address to the routing header and forwards the discovery request on all available MANET links 16. As illustrated in FIG. 1, the discovery request propagates along the path of mobile nodes "RC", "RD", "RE", "F", "G", "RH", until the discovery request 42 of FIG. 4 reaches the target node "H" 14 in step 54. As illustrated in FIG. 4, the discovery request 42 received by the target node "H" 14 includes a routing header 90 that specifies the explicit path from the originator 92 of the discovery request (mobile host "C" 14) to the target 94 of the discovery request. The discovery request 42 received by the target node "H" 14 also includes a hop count field 96 that specifies the number of a hops from the originator 92 to the target 94 via the explicit path "RC", "RD", "RE", "F", "G", "RH" specified in the routing header 90.

The target node "H" 14 responds in step 54 to the received route discovery message 42 by outputting a reply message 44, in accordance with the reactive routing protocol (e.g., DSR, AODV, etc.), specifying a source address field 100 with the network address of the target node "H" 14, a destination address field 102 with the network address of the originating node "C" 14, a routing header 104 specifying the reverse multi-hop path that is the reverse of the routing header 90, and the hop count field 96.

The mobile router "RH" 12 receives the reply message 44, parses the message 44 including the routing header 104, and forwards the packet 44 without any update to its internal "fisheye" routing table, based on the packet having originated from the next hop mobile node "H" 14. The mobile hosts "G" 14 and "F" 14 forward the packet in accordance with the explicit path 106 specified in the routing header 104 according to strict source routing.

The mobile router "RE" 12 receives in step 56 the reply 44: the routing resource 28 within the mobile router "RE" 12 detects from the explicit path 106 an explicit path to the neighboring mobile router "RH" 12 via the mobile hosts "F" and "G" 14. The routing resource 28 also determines that the mobile router "RH" is within its prescribed "scope" of three hops, and therefore the routing resource 28 adds in step 58 the routing table entry 26b specifying that the mobile router "RH" 12 is reachable via the explicit path 34 of nodes "F" and "G". The routing resource 28 also adds the source 36 of the discovery request (host node "C" 14), the target 38 of the discovery request (host node "H" 14), and the number of hops 40 based on the hop count field 96. As described below, the hop count field 40 is used to determine whether the stored entry 26 should be replaced with an improved path to the destination node specified in the destination node field 32.

Hence, the storage of the entry 26b in the "fisheye" routing table 24 of the mobile router "RE" 12 that the mobile router "RH" 12 is reachable via the explicit path "F-G" 34 enables the routing resource 28 to identify an established route to the mobile router "RH" 12. Hence, the explicit path 34 in the corresponding entry 26b renders the corresponding routing information in the strict source route 106 unnecessary; hence, the routing resource 28 of the mobile router "RE" 12 removes in step 60 of FIG. 3A (step 60a of FIG. 4) the explicit path for reaching the mobile router "RH" 12 from the strict source route 106, resulting in the modified routing header 108 of the reply message 46 of FIG. 4. Although not illustrated in FIG. 4, the routing resource 28 may replace the routing information with an index (e.g., the index value "E2" 30) in order to the explicitly specify the corresponding routing table entry; however, the routing resource 28 also may identify the modified routing header 108 in a subsequently received packet as a loose source route based on using the specified address for "RH" as an index to the "fisheye" routing table 24. The network interface 20 of the mobile router "RE" outputs the modified reply 46 having the modified routing header 108 to the next hop mobile router "RD" 12 in step 62 for delivery to the originator host node "C" 14.

Hence, the mobile router "RE" is able to learn the path 34 to the neighboring node "RH" 12 and create the corresponding "fisheye" routing table entry 26b from the received reply initiated by the target node "H" 14, without the necessity of outputting a single router advertisement message or requesting routing information from the mobile router "RH" 12.

In addition, subsequent mobile routers 12 along the path to the originator host node "C" 14 can learn explicit paths to their neighboring mobile nodes, and further compress the modified routing header 108 in the reply packet 46. For example, the mobile router "RD" 12 may simply forward the reply 46 to the next hop mobile router "RC" 12 without any modification, because the corresponding routing resource 28 in the mobile router "RD" 12 determines that the reply 46 does not include any explicit path to neighboring mobile routers 12 within the prescribed distance, since the mobile router "RE" 12 is a next hop node, and the mobile router "RH" 12 is outside the prescribed scope (i.e., distance) of three hops. Although not shown in FIG. 4, each reply 44, 46, and 48 also may include a local segment counter, described below with respect to FIGS. 6A and 6B, that is reset on every modification of the routing header 106 or 108 and incremented at each hop, in order to specify the number of hops that have occurred since modification of the routing header. The local segment counter also enables each mobile router 12 to ensure that only a strict source route would be compressed, and not a loose source route having already been compressed.

The mobile router "RC" 12, in response to receiving the reply 46, determines from the local segment counter (not shown) that the mobile router "RE" 12 is within its prescribed scope of three hops, and therefore the corresponding routing resource 28 adds in its corresponding "fisheye" routing table an entry specifying the path to the neighboring mobile router "RE" 12 via the next hop mobile router "RD" 12. The routing resource 28 of the mobile router "RC" 12 also removes in step 60 of FIG. 3A (step 60b of FIG. 4) the unnecessary explicit path to the mobile router "RE" 12 (via mobile router "RD" 12) from the routing header 108, and compresses the routing header 108 into the modified routing header 110 of the reply 48.

Hence, the originator of the discovery request, namely the host node "C" 14, receives the reply 48 that includes the loose source route 110, as opposed to the strict source route 106, enabling each of the mobile routers 12 along the path 110 to insert the explicit path into the routing header based on the corresponding entry 26 in the corresponding "fisheye" routing table 24. In addition, each mobile router can determine the optimum path to the next hop specified in the loose source route path 110, improving path communications as new links are established.

For example, if in step 64 the mobile router "RC" 12 were to receive an additional packet specifying another path to the mobile router "RE" 12, for example based on an alternate link 16' in FIG. 1 having been established by the mobile router "RE" 12, the routing resource 28 in the mobile router "RC" 12 would determine in step 66 if the distance to the other mobile router "RE" 12 was shorter via the second path; if the distance to the other mobile router was not shorter, the routing resource 28 also would determine in step 68 whether the overall distance between the originator and the target was shorter than the corresponding hop count 40 specified between the source 36 and the target 38, for example to accommodate improved paths between the source and target that are outside the scope of the mobile router. In such cases, the routing resource 28 would update the "fisheye" routing table 24 in step 70 if the distance to the other mobile router was shorter, or if the overall hop distance between the originator and target was shorter (in the latter case, the routing resource 28 may store an exception routing table entry for use for traffic between the specified source and destinations).

FIG. 3B illustrates the method by each of the mobile routers 12 in performing the expansion of a loose source routing header 110 based on stored "fisheye" routing table entries 26 that specify an explicit path for reaching a neighboring mobile ad hoc node specified in the loose source route 110. Assume, for example, that the mobile host "C" outputs to the mobile router "RC" 12 a packet destined toward the mobile host "H" 14 and that specifies the loose source route 110. In response to the network interface 20 of the mobile router "RC" receiving the packet in step 72, the corresponding routing resource 28 determines the explicit path to the next specified hop ("RE" via "RD") based on retrieving in step 74 the corresponding explicit path from its "fisheye" routing table 24. As described previously, the routing resource 28 of the mobile router "RC" may access its corresponding "fisheye" routing table 24 using either an explicit index value in the loose source route 110, or based on utilizing the address of the specified next hop as an index to the routing table 24. The routing resource 28 of the mobile router "RC" 12 inserts in step 76 the explicit path for reaching the next specified hop in the loose source route 110, resulting in the expanded routing header resembling the routing header 108 of FIG. 4. The network interface 20 of the mobile router "RC" 12 outputs in step 78 the packet having the expanded routing header to the next hop explicitly specified.

As apparent from the foregoing, the steps of FIG. 3B are repeated by the mobile router "RE" 12 in response to detecting the loose source route resembling the routing header 108: the routing resource 28 of the mobile router "RE" 12 retrieves the explicit path 34 ("RH" via "F" and "G") from the routing table entry 26b in step 74, and inserts the explicit path 34 into the loose source route in step 76, resulting in the path resembling the strict source route 106 of FIG. 4. The packet is output by the mobile router "RE" 12 in step 78 with the strict source route 106.

Hence, each mobile router 12 is configured for selectively compressing a routing header based on removing an explicit route for reaching a mobile ad hoc node identified as reachable by its corresponding "fisheye" routing table 24. The destination 32 in the routing table 24 may be applicable to a host node 14, as appropriate. The procedure in each mobile router of storing an explicit route from a routing header of a packet having passed the explicit route, removing the explicit route from the routing header, and adding the explicit route to another routing header for delivery via the explicit route, enables loose source routing to be implemented in the MANET network 10 without the necessity of implementing routing protocols requiring advertisements or responses between the mobile routers 12. Rather, the mobile routers 12 can rely on learning paths from the reactive discovery and reply messages sent by the mobile hosts 14. Also note that a mobile router now may be able to respond to discovery messages based on cached replies.

The disclosed embodiment also can be applied to reverse routing headers, as described in the above-incorporated parent application Ser. No. 11/324,270. Hence, the mobile routers 12 can learn explicit paths to neighboring nodes within the corresponding "scope" based on parsing the reverse routing headers, and compressing the reverse routing headers by removing the explicit paths to the neighboring nodes.

Figure 5:
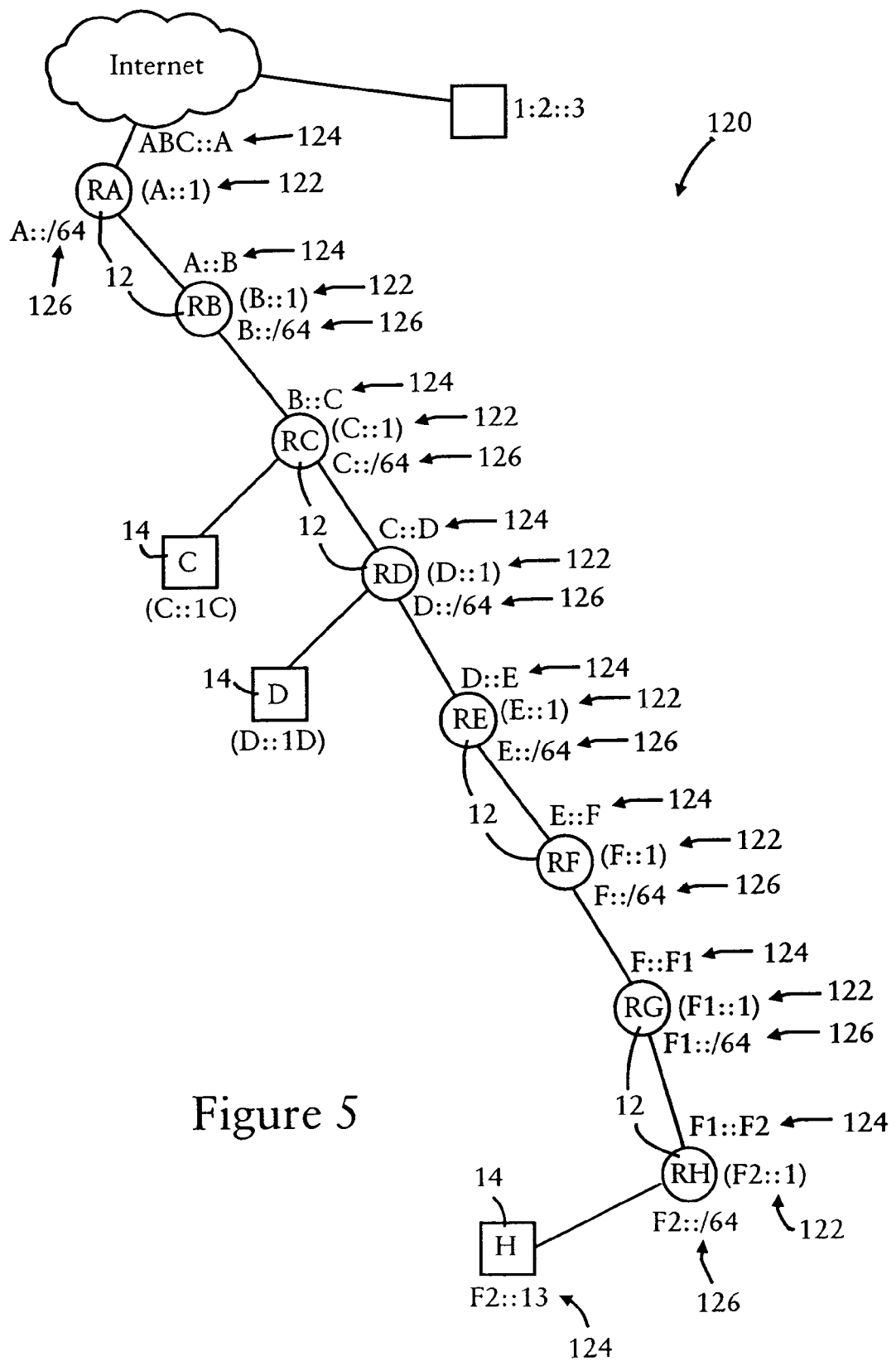
FIG. 5 is a diagram illustrating a variation of the mobile ad hoc network of FIG. 1.

FIG. 5 is a diagram illustrating a MANET network 120 that includes mobile routers 12 and mobile hosts 14. The mobile routers 12 are the same as illustrated in FIG. 2, except that in this example the corresponding routing resource is configured for storing routing information retrieved from a reverse routing header. In addition, each MANET resource 22 is configured such that each mobile router has a home address 122 and an attachment address 124 for attachment to an attachment router 12 using a corresponding delegated address prefix 126, described in detail in the above-incorporated application Ser. No. 11/324,270.

Figure 6A:
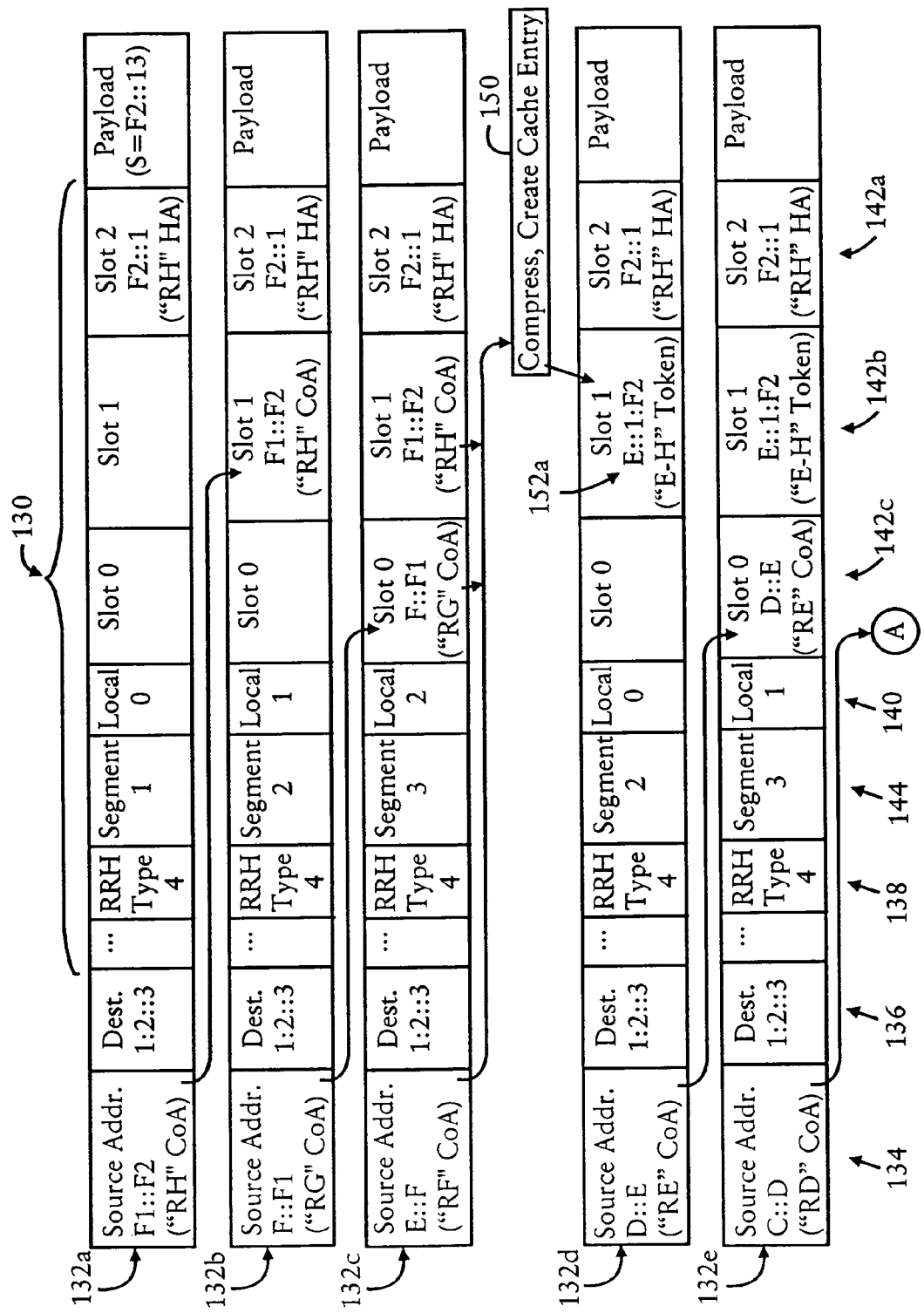
FIGS. 6A and 6B are diagrams summarizing compression of reverse routing headers in a packet that traverses the network of FIG. 5, according to another embodiment of the present invention.
Figure 6B:
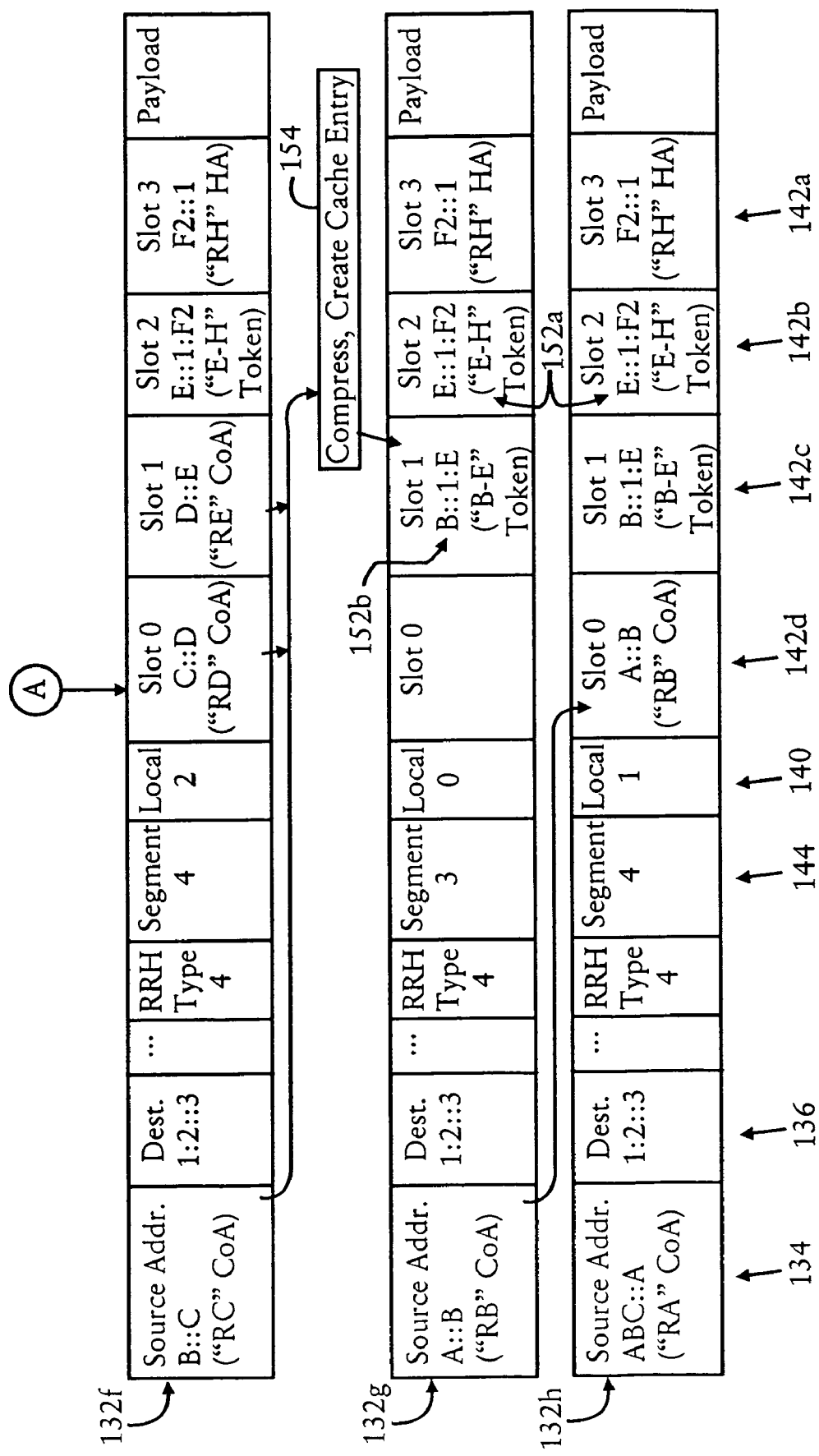

FIGS. 6A and 6B are diagrams illustrating modification of a reverse routing header 130 within data packets 132a, 132b, . . . 132h by the mobile routers 12 in the MANET 120, according to an embodiment of the present invention. Each data packet 132 includes a source address field 134, a destination address field 136, and a reverse routing header 130 that includes a routing header type field 138, a local index field 140, and routing slots 142 (e.g., 142a, 142b, 142c, 142d). In particular, FIGS. 6A and 6B illustrate modification of the reverse routing headers described in the above-incorporated published U.S. Patent Publication No. US 2004/0117339, in that an explicit path for reaching a neighboring mobile router is removed from the reverse routing header 130, and replaced with summary routing information in the form of an "index" (i.e., token).

For example, the packet 132a output by the mobile router "RH" 12 specifies the attachment address "F1::F2" 124 in the source address field 112, and its home address (HA) "F2::1" 122 in the slot 142a of the reverse routing header 130. The routing resource 28 of the mobile router "RH" 12, in addition to creating the reverse routing header 130, also increments the local index 140 and the segment field 144 to specify one slot 142 in use (the segment field 144 specifies the number of slots 142 that store valid data).

The mobile router "RG" 12 updates the reverse routing header 130, as described in the published U.S. Patent Publication No. US 2004/0117339, by moving the source address value "F1::F2" to the next slot position 142b, incrementing the local index field 140 and the segment field 144, and adding its own attachment address "F::F1" 124 to the source address field 112 of the data packet 132b. The mobile router "RF" 12 repeats the procedure above-described to generate the data packet 132c. At each step, the local index field is less than three, which is the prescribed threshold utilized by the routing resource 28 in each of the mobile routers 12 to compress the reverse routing header.

The routing resource 28 of the mobile router "RF" 12, however, determines that simply updating the reverse routing header 130 would cause the local index field 140 to exceed the prescribed threshold of "3"; hence, the routing resource 28 of the mobile router "RF" 12 stores the explicit path to the mobile router "RH" 12 ("F1::F2" via "F:: F1") and compresses the explicit path in step 150 by inserting the index 152a in slot 142b. The routing resource 28 of the mobile router "RF" 12 resets the local index field 140 to zero, adjusts the segment field 144, adds its care-of address "D::E" 124 to the source address field 134, and outputs the packet 132d. The mobile routers "RD" 12 and "RC" 12 output the packets 132e and 132f (FIG. 6B), respectively, based on conventional updating of the reverse routing header 130 due to the local index field 140 being less than the prescribed threshold of "3".

Referring to FIG. 6B, the routing resource 28 of the mobile router "RB" 12 determines that simply updating the reverse routing header 130 of the packet 132f would cause the local index field 140 to exceed the prescribed threshold of "3"; hence, the routing resource 28 of the mobile router "RB" 12 stores the explicit path to the mobile router "RE" 12 ("C::D" via "D::E") and compresses the explicit path in step 154 by inserting the index 152b in slot 142c. The routing resource 28 of the mobile router "RB" 12 resets the local index field 140 to zero, adjusts the segment field 144, adds its care-of address "A::B" 124 to the source address field 134, and outputs the packet 132g. The mobile router "RA" 12 outputs the packets 132h based on conventional updating of the reverse routing header 130 due to the local index field 140 being less than the prescribed threshold of "3".

According to the disclosed embodiment, mobile ad hoc network routers obtain routing information in the form of explicit path routing information from routing headers (e.g., from discovery replies or reverse routing headers) for mobile ad hoc nodes that are within a prescribed "scope" (i.e., a prescribed distance from the mobile ad hoc router). Hence, each mobile ad hoc router is configured for selectively compressing the routing header by removing the explicit path routing information that is stored by the mobile ad hoc router, enabling the strict source route in the packet to be replaced by a loose source route, without the necessity of distributing routing information among the mobile routers.

As apparent from the foregoing, various reactive routing protocols may be used, and a mobile router also may parse discovery requests received via an explicit path from the originator to learn of neighboring nodes along the path in between the originator and the mobile router. In addition, a mobile router may obtain routing information for its fisheye routing table 24 based on an external routing protocol that exhibits fisheye properties, namely a routing protocol that provides more specific routing information for routes and nodes nearer the corresponding mobile router, and less specific routing information for routes and nodes further away from the corresponding mobile router.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a mobile ad hoc router that is within a mobile ad hoc network, the method including:
   receiving, by the mobile ad hoc router, routing information that identifies a mobile ad hoc node within the mobile ad hoc network and that is reachable within a prescribed distance of the mobile ad hoc router;
   storing by the mobile ad hoc router a routing table entry in response to reception of the routing information and that specifies an explicit hop-by-hop path for reaching the mobile ad hoc node within the prescribed distance, the explicit hop-by-hop path including a network address of a next hop network node along the explicit hop-by-hop path for reaching the mobile ad hoc node;
   modifying, by the mobile ad hoc router, a routing header of a received packet into a modified routing header, the modifying including one of:
   (1) compressing a size of the routing header to form the modified routing header based on removing the explicit hop-by-hop path for reaching the mobile ad hoc node from the routing header, based on the routing header identifying that the received packet is from the explicit hop-by-hop path, or
   (2) expanding the routing header to form the modified routing header based on inserting the explicit hop-by-hop path stored in the routing table entry into the routing header, based on the routing header identifying the received packet is to be sent via the mobile ad hoc node; and
   outputting the received packet, having the modified routing header, toward a destination address specified by the received packet.

2. The method of claim 1, wherein the receiving includes obtaining the routing information from the corresponding routing header of a reply to a discovery message, the discovery message having been sent via the explicit hop-by-hop path between an originator of the discovery message and a target of the discovery message, the reply having been sent by the target.

3. The method of claim 2, further comprising:
   receiving a second packet that specifies within the corresponding routing header a second explicit hop-by-hop path for reaching the mobile ad hoc node within the prescribed distance; and
   selectively replacing the explicit hop-by-hop path in the routing table entry with the second explicit hop-by-hop path based on whether the second explicit hop-by-hop path has a corresponding shorter distance to the mobile ad hoc node than the explicit hop-by-hop path in the routing table entry.

4. The method of claim 3, wherein:
   the routing header of the reply specifies a first hop count identifying a corresponding number of hops between the corresponding target and the corresponding originator;
   the storing includes specifying within the routing table entry the first hop count identifying the corresponding number of hops between the target and the originator; and
   the selectively replacing including determining whether to replace the explicit hop-by-hop path based on whether the second packet specifies a second corresponding hop count that is less than the first hop count stored in the routing table entry.

5. The method of claim 1, wherein:
   the receiving includes obtaining the routing information from the routing header of the received packet, the routing header specifying the routing information as a reverse routing header that includes the explicit hop-by-hop path;
   the storing including storing the explicit hop-by-hop path based on the explicit hop-by-hop path exceeding a prescribed minimum distance; and
   the removing including removing the explicit hop-by-hop path from the reverse routing header.

6. The method of claim 1, wherein the removing includes replacing the explicit hop-by-hop path in the routing header with an index value that identifies the routing table entry.

7. The method of claim 6, wherein the inserting includes:
   detecting the index value within the routing header, the index value identifying the received packet is to be sent via the mobile ad hoc node; and
   retrieving the explicit hop-by-hop path, for insertion into the routing header, in response to detecting the corresponding index value in the routing header.

8. The method of claim 1, wherein the receiving includes obtaining the routing information from the corresponding routing header of the received packet, the modifying including removing the explicit hop-by-hop path from the received packet.

9. A mobile ad hoc router configured for routing packets within a mobile ad hoc network, the mobile ad hoc router comprising:
   a network interface configured for receiving routing information that identifies a mobile ad hoc node within the mobile ad hoc network and that is reachable within a prescribed distance of the mobile ad hoc router; and
   a routing resource configured for storing a routing table entry in response to reception of the routing information and that specifies an explicit hop-by-hop path for reaching the mobile ad hoc node within the prescribed distance, the explicit hop-by-hop path including a network address of a next hop network node along the explicit hop-by-hop path for reaching the mobile ad hoc node;
   the routing resource configured for modifying a routing header of a received packet into a modified routing header, based on one of:
   (1) compressing a size of the routing header to form the modified routing header based on removing the explicit hop-by-hop path for reaching the mobile ad hoc node from the routing header, based on the routing header identifying that the received packet is from the explicit hop-by-hop path, or
   (2) expanding the routing header to form the modified routing header based on inserting the explicit hop-by-hop path stored in the routing table entry into the routing header, based on the routing header identifying the received packet is to be sent via the mobile ad hoc node;
   the network interface configured for outputting the received packet, having the modified routing header, toward a destination address specified by the received packet.

10. The mobile ad hoc router of claim 9, wherein the routing resource is configured for obtaining the routing information from the corresponding routing header of a reply to a discovery message, the discovery message having been sent via the explicit hop-by-hop path between an originator of the discovery message and a target of the discovery message, the reply having been sent by the target.

11. The mobile ad hoc router of claim 10, wherein:
the network interface is configured for receiving a second packet that specifies within the corresponding routing header a second explicit hop-by-hop path for reaching the mobile ad hoc node within the prescribed distance;
the routing resource configured for selectively replacing the explicit hop-by-hop path in the routing table entry with the second explicit hop-by-hop path based on whether the second explicit hop-by-hop path has a corresponding shorter distance to the mobile ad hoc node than the explicit hop-by-hop path in the routing table entry.

12. The mobile ad hoc router of claim 11, wherein:
the routing header of the reply specifies a first hop count identifying a corresponding number of hops between the corresponding target and the corresponding originator;
the routing resource configured for specifying within the routing table entry the first hop count identifying the corresponding number of hops between the target and the originator; and
the routing resource configured for determining whether to replace the explicit hop-by-hop path based on whether the second packet specifies a second corresponding hop count that is less than the first hop count stored in the routing table entry.

13. The mobile ad hoc router of claim 9, wherein:
the routing resource is configured for obtaining the routing information from the routing header of the received packet, the routing header specifying the routing information as a reverse routing header that includes the explicit hop-by-hop path;
the routing resource configured for storing the explicit hop-by-hop path based on the explicit hop-by-hop path exceeding a prescribed minimum distance; and
the routing resource configured for removing the explicit hop-by-hop path from the reverse routing header.

14. The mobile ad hoc router of claim 9, wherein the routing resource is configured for replacing the explicit hop-by-hop path in the routing header with an index value that identifies the routing table entry.

15. The mobile ad hoc router of claim 14, wherein the routing resource is configured for inserting the explicit hop-by-hop path into the routing header based on:
detecting the index value within the routing header, the index value identifying the received packet is to be sent via the mobile ad hoc node; and
retrieving the explicit hop-by-hop path, for insertion into the routing header, in response to detecting the corresponding index value in the routing header.

16. The mobile ad hoc router of claim 9, wherein the routing resource is configured for obtaining the routing information from the corresponding routing header of the received packet, and modifying the routing header by removing the explicit hop-by-hop path from the received packet.

17. A mobile router configured for routing packets within a mobile ad hoc network, the mobile router comprising:
means for receiving routing information that identifies a mobile ad hoc node within the mobile ad hoc network and that is reachable within a prescribed distance of the mobile ad hoc router;
means for storing a routing table entry based on reception of the routing information and that specifies an explicit hop-by-hop path for reaching the mobile ad hoc node within the prescribed distance, the explicit hop-by-hop path including a network address of a next hop network node along the explicit hop-by-hop path for reaching the mobile ad hoc node; and
means for modifying a routing header of a received packet into a modified routing header, by one of:
(1) compressing a size of the routing header to form the modified routing header based on removing the explicit hop-by-hop path for reaching the mobile ad hoc node from the routing header based on the routing header identifying that the received packet is from the explicit hop-by-hop path, or
(2) expanding the routing header to form the modified routing header based on inserting the explicit hop-by-hop path stored in the routing table entry into the routing header, based on the routing header identifying the received packet is to be sent via the mobile ad hoc node;
the means for receiving further configured for outputting the received packet, having the modified routing header, toward a destination address specified by the received packet.

18. The method of claim 1, wherein the explicit hop-by-hop path specifies the network address of the next hop network node, and a second network address of a second network node reachable via the next hop network node.

19. The mobile ad hoc router of claim 9, wherein the explicit hop-by-hop path specifies the network address of the next hop network node, and a second network address of a second network node reachable via the next hop network node.

20. The mobile router of claim 17, wherein the explicit hop-by-hop path specifies the network address of the next hop network node, and a second network address of a second network node reachable via the next hop network node.

* * * * *